July 19, 1932.  W. SUDBRINK  1,868,031
GLARE SHIELD FOR VEHICLES
Filed May 7, 1931
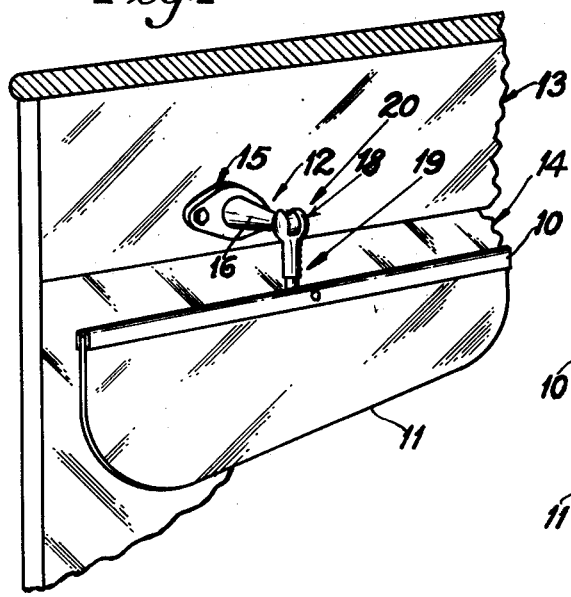
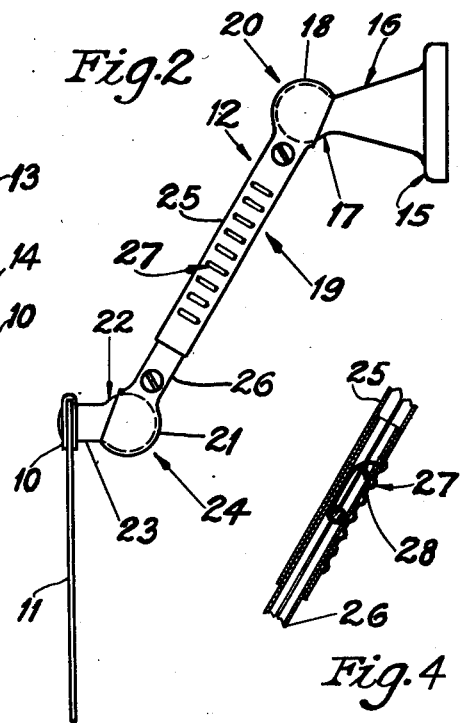
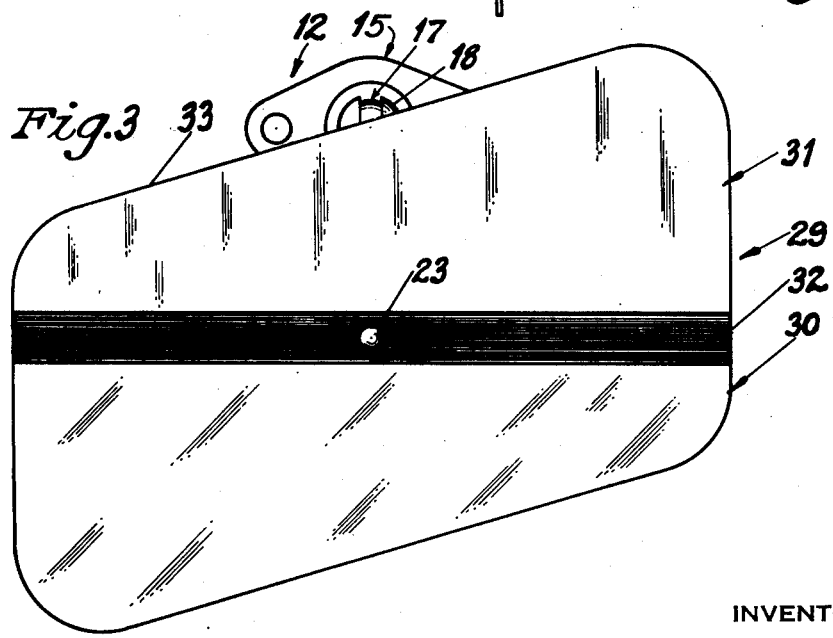
INVENTOR
WILLIAM SUDBRINK
BY HIS ATTORNEY
Joseph Blacker Patented July 19, 1932

1,868,031

UNITED STATES PATENT OFFICE

WILLIAM SUDBRINK, OF NEW YORK, N. Y.

GLARE SHIELD FOR VEHICLES

Application filed May 7, 1931. Serial No. 535,692.

It is well known that operators of automobiles are often temporarily blinded by the glare of headlights striking their eyes, and not being able to see the roadway they steer into a ditch or into an obstruction.

The present invention relates to improvements in glare shields for automobiles and other vehicles, and the principal object thereof is to provide a simple device positioned in front of the operator just inside of the windshield to diminish the intensity of the rays of the sun or the rays of automobile headlamps which otherwise would strike and dazzle the eyes of the operator.

Another object of this invention is to provide an attaching device, comprising two universal joints and an extensible suspension member which make it possible to move the glare shield to a position adjacent the windshield and to swivel the glare shield and to place it on an angle to the right or to the left of the operator so that the shield may face the glare no matter from which direction the glare comes.

Another object of this invention is to provide a duplex glare shield for diminishing oppositely-directed glares and consisting of a partially-transparent zone and a partially-reflecting zone slightly spaced apart by a narrow non-reflecting opaque zone and serving to present before the operator two distinct and closely spaced and non-merging images of front and rear road conditions simultaneously visible to the operator at a glance and also serving to protect the eyes of the operator from dazzling rays of light from headlights of automobiles approaching in front, as well as from headlights of automobiles following in the rear in night driving.

Another object of this invention is to provide a duplex glare shield of a very simple construction, which can be manufactured to sell at low cost.

With these and other objects in view, the invention will be hereinafter more particularly described, and the combination and arrangement of parts will be shown in the accompanying drawing and pointed out in the claims which form part of this specification, it being understood that various changes in the form, proportion, size and minor details of construction, within the scope of the claims, may be resorted to without departing from the spirit of the invention as expressed in the claims.

Reference will now be had to the drawing, wherein like numerals of reference designate corresponding parts throughout the several views, in which:

Figure 1 is a perspective view of a windshield of an automobile with the glare shield applied thereto.

Figure 2 is a side view of the glare shield.

Figure 3 is a front view of a modified or duplex glare shield.

Figure 4 is a fragmentary section of the attaching device.

Referring to Figures 1 and 2, the glare shield structure comprises a clamping member 10, which supports a translucent sheet of triangular shaped pyrolene 11, and a swivelling attaching device 12, to which the pyrolene is movably connected. The attaching device 12 is fastened to the vehicle body 13 above the windshield 14 and in front of the operator by means of a bracket 15 having thereon a right angularly disposed extension 16, which terminates at its free end in a ball-shaped enlargement 17. The ball-shaped enlargement 17 is housed in frictional engagement in a hollow spherical shell 18, at one end of, and in right-angular relation with the axis of a suspension member 19, and forming a universal joint 20. At the lower end of the suspension member 19, there is provided a hollow spherical shell 21, positioned in right-angular relation with the axis of the suspension member and in which is housed in frictional engagement a ball-shaped enlargement 22 at one end of a rod 23 and forming a universal joint 24. The other end of the rod 23 is fixedly attached in right-angular relation to the clamping member 10, which supports the glare shield 11.

The suspension member 19, is preferably made of two relatively slidable tubular members 25 and 26, the tubular member 25 having an inside diameter of the same size as the outside diameter of the member 26. The member 25 is provided with a plurality of rack teeth or notches 27, pressed outwardly and the member 26 being provided with an outwardly facing spring 28, best shown in Figure 4. The spring 28 engages with one of the notches 27. It is thus possible to extend or shorten the length of the suspension member 19, by sliding the member 26 in the member 25, the spring 28 automatically changing its engagement with one of the successive notches 27.

The swivelling attaching device 12 comprises the suspension member 19 for to and fro adjustment and two universal joints 20 and 24 for radial adjustment and giving the necessary swivel action to permit movement of the glare shield into the line of vision of the operator whereby to shield his eyes from glare. The glare shield is thus adapted for both to and fro and radial adjustment, the radial adjustments inclining the shield at any angle in which the operator may desire to place it.

The glare shield is preferably made about ten inches wide so that the operator experiences no difficulty in adjusting the glare shield in his line of vision. The lower right hand corner of the glare shield is preferably cut away to permit vision under the shield.

Referring to Figure 3, it will be noted that there has been provided a modified or duplex glare shield 29, comprising a lower glare shield 30, of translucent material and an upper glare shield 31, of opaque material but covered with black enamel and adapted to cause partial reflection of rays of light. Both glare shields are mounted in a clamping member 32, which is opaque and covered with a flat paint which absorbs all the light rays and forms a non-reflecting surface. The translucent lower glare shield 30, serves to shield the operator from front view glares caused by the headlights of vehicles approaching in the front, also from glares due to the sun. The enameled surface upper glare shield 31, serves to shield the operator from rear view glares coming through the rear window of the automobile and caused by the headlights of vehicles following in the rear in night driving. The surface 32, forms a narrow, opaque, non-reflecting neutral zone serving to space the glare shields slightly apart, to prevent the images from merging and thus maintaining their individual distinctiveness. The operator can thus by looking simultaneously below and above the neutral zone 32, tell unmistakably at a glance which of the glaring lights are directed from the front and which are directed from the rear.

It is thus seen that with the attaching device structure as described, the glare shield may be set to any desired vertical angle to the right or to the left of the operator and that it will stay set, as the vibration of the automobile will not affect the frictional grip of the universal joints or the position of the shield and the operator is enabled to comfortably and simultaneously view the road conditions to the front and to the rear of his car under dazzling light conditions; thus by a forward glance at the duplex glare shield he notes the condition of the traffic at the front and rear simultaneously.

It is to be noted that the front view image generally appears at the left hand side of the lower glare shield and the rear view image generally appears at the right hand side of the upper glare shield, both images appearing in an angular direction with respect to the spacing zone 32. As shown in Figure 3, the lower edge of the shield 30, and the upper edge of the shield 31, are angularly positioned with respect to the spacing zone 32, the said edges being substantially parallel to each other, and serve between them to guide the eyes of the operator in the direction along which the images of the front and rear glares appear.

Having thus described my invention, I claim as new and desire to secure by Letters Patent:

1. In a duplex glare shield adapted for diminishing oppositely-directed glares in a vehicle body, the combination with a support and means for adjusting the position of said duplex glare shield for simultaneous visibility through the windshield and rear window, one of said glare shields being of partially-transparent material for diminishing front view glares and being positioned below a narrow non-reflecting opaque spacing zone extending the full width of the duplex glare shield, and the other glare shield being of opaque and enameled material and forming a surface adapted to absorb the rear view glares and causing only partial reflection of said glares and being positioned above said non-reflecting spacing zone, said glare shields serving to present two distinct and closely spaced and non-merging images of front and rear road conditions simultaneously visible to the operator at a glance.

2. In a duplex glare shield adapted for diminishing oppositely-directed glares in a vehicle body, the combination with a support and swivelling means for adjusting the position of said duplex glare shield for simultaneous visibility through the windshield and rear window and in the line of sight of the vehicle operator, one of said glare shields being of partially-transparent material for diminishing front view glares and being positioned below a narrow non-reflecting opaque zone extending the full width of the duplex glare shield, and the other glare shield being of opaque and darkened material and forming a surface adapted to absorb the rear view glares and causing only partial reflection of said glares and being positioned above said non-reflecting spacing zone, said glare shields being mounted in unison with said intermediate spacing zone and being non-shiftable with respect to each other and serving to present two distinct and closely spaced and non-merging images of front and rear road conditions simultaneously visible to the operator at a glance, the lower shield having its lower edge and the upper shield having its upper edge angularly positioned with respect to said spacing zone and the said edges being substantially parallel to each other.

Signed at New York, in the county of Bronx and State of New York, this 6th day of May, A. D. 1931.

WILLIAM SUDBRINK.